United States Patent
Zhang et al.

(10) Patent No.: US 10,241,894 B2
(45) Date of Patent: Mar. 26, 2019

(54) DATA-SCOPED DYNAMIC DATA RACE DETECTION

(75) Inventors: Yuan Zhang, Bellevue, WA (US); Hazim Shafi, Redmond, WA (US); Khaled S. Sedky, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 846 days.

(21) Appl. No.: 12/823,794

(22) Filed: Jun. 25, 2010

(65) Prior Publication Data

US 2011/0320745 A1 Dec. 29, 2011

(51) Int. Cl.
*G06F 11/36* (2006.01)

(52) U.S. Cl.
CPC ...... *G06F 11/3636* (2013.01); *G06F 11/3624* (2013.01)

(58) Field of Classification Search
CPC ............. G06F 11/3466; G06F 11/3644; G06F 11/3624; G06F 21/79; G06F 2201/805; G06F 11/3612; G06F 11/3636; G06F 11/0751; G06F 11/3604; G06F 11/36; G06F 2201/865; G06F 9/3004; G06F 9/3009; G06F 11/3668
USPC ............. 714/127, 30, 35, E11.029; 718/100; 717/124, 126, 131, 141, 152
See application file for complete search history.

(56) References Cited

U.S. PATENT DOCUMENTS

| | | | | |
|---|---|---|---|---|
| 6,832,302 B1 * | 12/2004 | Fetzer | ..................... | G06F 21/52 711/154 |
| 6,920,634 B1 * | 7/2005 | Tudor | ...................... | G06F 9/52 711/141 |
| 7,076,776 B2 | 7/2006 | Kim et al. | | |
| 7,549,150 B2 | 6/2009 | Yu | | |
| 7,673,181 B1 * | 3/2010 | Lindo et al. | ............... | 714/38.13 |
| 2007/0006047 A1 * | 1/2007 | Zhou | ..................... | G06F 11/348 714/38.1 |
| 2007/0245312 A1 * | 10/2007 | Qadeer et al. | ................ | 717/124 |
| 2008/0120627 A1 * | 5/2008 | Krauss | .................. | G06F 9/5016 719/328 |
| 2009/0199162 A1 * | 8/2009 | Choi et al. | .................... | 717/124 |
| 2011/0126190 A1 * | 5/2011 | Urbach | ........................ | 717/178 |
| 2012/0204062 A1 * | 8/2012 | Erickson et al. | ............... | 714/35 |

OTHER PUBLICATIONS

Letko et al, AtomRace: Data Race and Atomicity Violation Detector and Healer, Jul. 21, 2008, 1-10.*
Savage et al., Eraser: A Dynamic Data Race Detector for Multithreaded Programs, 1997, 391-411.*

(Continued)

*Primary Examiner* — David T. Brooks
*Assistant Examiner* — Berhanu Mitiku
(74) *Attorney, Agent, or Firm* — Dicke, Billig & Czaja, PLLC

(57) ABSTRACT

A dynamic shared-memory data race detection tool with data-scoping capabilities to reduce runtime overheads is disclosed. The tool allows users to restrict analysis of memory locations to heap and/or stack variables that are of interest to them using explicit calls to functions provided in a library that is part of the race detection tool. The application code is instrumented to insert probes at all memory instructions and linked with the data race detection library to perform data-scoped race detection.

20 Claims, 3 Drawing Sheets

(56) References Cited

OTHER PUBLICATIONS

Letko et al. "AtomRace: Data Race and Atomicity Violation Detector and Healer" Brno University of Technology, Czech Republic (EU) Apr. 17, 2008*

Letko et al. "Atom Race: Data Race and Atomicity Violation Detector and Healer" PADTAD '08 Jul. 20-21, 2008, Seattle, Washington, USA (Year: 2008).*

O'Callahan, et al., "Hybrid Dynamic Data Race Detection", Retrieved at <<http://web.cs.msu.edu/~cse914/Readings/hybrid-DynamicRaceDetection-ppopp03.pdf >>, Proceedings of the ninth ACM SIGPLAN symposium on Principles and practice of parallel programming, Jun. 11-13, 2003, pp. 167-178.

Savage, et al., "Eraser: A Dynamic Data Race Detector for Multithreaded Programs", Retrieved at <<http://citeseerx.ist.psu.edu/viewdoc/download?doi=10.1.1.39.9581&rep=rep1&type=pdf >>, ACM Transactions on Computer Systems, vol. 15, No. 4, Nov. 1997, pp. 391-411.

Yu, et al., "RaceTrack: Efficient Detection of Data Race Conditions via Adaptive Tracking", Retrieved at <<http://research.microsoft.com/pubs/65170/sosp05-racetrack.pdf >>, Proceedings of the 20th ACM Symposium on Operating Systems, Principles 2005, SOSP, Oct. 23-26, 2005, pp. 14.

Letko, et al., "AtomRace: Data Race and Atomicity Violation Detector and Healer", Retrieved at <<http://www.fit.vutbr.cz/~vojnar/Publications/lvk-padtad-08.pdf >>, International Symposium on Software Testing and Analysis, Proceedings of the 6th workshop on Parallel and distributed systems: testing, analysis, and debugging, Jul. 20-21, 2008, pp. 11.

Pratikakis, et al., "Locksmith: Context-Sensitive Correlation Analysis for Race Detection", Retrieved at <<http://www.cs.umd.edu/~jfoster/papers/pldi06.pdf >>, Proceedings of the ACM SIGPLAN 2006 Conference on Programming Language Design and Implementation, Jun. 11-14, 2006, pp. 12.

Marino, et al., "LiteRace: Effective Sampling for Lightweight Data-Race Detection", Retrieved at <<http://portal.acm.org/citation.cfm?id=1542476.1542491&coll=ACM&dl=ACM&type=series&idx=SERIES363&part=series&WantType=Proceedings&title=PLDI&CFID=51873382&CFTOKEN=68252466 >>, Conference on Programming Language Design and Implementation, Proceedings of the 2009 ACM SIGPLAN conference on Programming language design and Implementation.

"Why are Race Conditions so Difficult to Detect," from Multithreaded Programming with TreadMentor: A Tuitorial by Dr. C.-K. Shene, pp. 4, (2001-2014). <<Retrieved from: https://www.cs.mtu.edu/~shene/NSF-3/e-Book/RACE/difficult.html>>.

Carr, Steve et al., "Race Conditions: A case Study," The Journal of Computing in Small College, vol. 17, No. 1, pp. 88-102 pp. (Oct. 2001).

* cited by examiner

DATA-SCOPED DYNAMIC DATA RACE DETECTION

BACKGROUND

Concurrent programming for shared-memory multiprocessors can include the ability for multiple threads to access the same data. The multiple threads execute on multiple processors, multiple logical processor cores, or other classes of parallelism that are attached to a memory shared between the processors. The shared-memory model is the most commonly deployed method of multithread communication. In such systems, concurrent threads can attempt to access and modify the same data in the shared-memory. This can lead to data race conditions, which can create other undesired or potentially harmful effects in concurrent programming and the stored data.

A data race occurs in a multithreaded program when at least two concurrent threads access the same memory location without synchronization where at least one of the accesses is a write operation. Data races indicate a programming error, which can be difficult to isolate because of the non-deterministic features of multithreaded programming. The schedule of threads is timing sensitive, and data races are difficult to reproduce even when the concurrent program is repeatedly executed with the same inputs. To make matter more difficult, data races often result in corrupted memory in shared data structures that do not result in immediate failures of the program, and bugs resulting from data races may not manifest until later executed portions of the concurrent program as mysterious failures in unrelated portions of code.

Researchers have attempted to develop automated tools for detecting data races in concurrent programs. Static data race detection techniques generally provide comprehensive coverage of the concurrent program by reasoning data races on all execution paths. Static techniques, however, tend to over estimate assumptions that can lead to a large number of falsely detected data races. Dynamic data race detection techniques are more precise than static techniques, but their coverage is limited to execution paths and interleaving occurring during runtime. Dynamic techniques, however, often incur debilitating performance overheads of up to a two hundred times slowdown in certain unmanaged programs. Large performance overheads have prevented the wide-scale adoption of dynamic data race detectors in practice.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A dynamic shared-memory data race detection tool with data-scoping capabilities to reduce runtime overheads is disclosed. The tool allows users to restrict analysis of memory locations to heap and/or stack variables that are of interest to them using explicit calls to functions provided in a library that is part of the race detection tool. The application code is instrumented to insert probes at all memory instructions and linked with the data race detection library to perform data-scoped race detection.

The present disclosure is directed to a data-scoped dynamic data race detector that can test for data races on a defined subset of shared memory locations. A method of data detection used with the data race detector includes defining developer-selected target memory locations, launching a data race detector in the target memory locations, and monitoring memory accesses of an application within the target memory locations for data races. A data race detector applies an algorithm to monitor the target memory locations and to issue a race condition warning if a common lock or synchronization is not protecting the concurrent access within the target memory locations. In one example, the data race detector includes an execution component and a library component. The execution component launches the application along with the data race detector. The library component implements a data race detection engine and provides application program interfaces for defining target memory locations and other functions.

The method monitors just the memory access of the application in the defined target memory location so overhead is reduced. Developers can define the target memory location to cover an area where data races are suspected. Also, the method can be repeated with a wider defined set of target memory locations or on another set of defined target memory locations until the developer is satisfied with the amount of data race bug coverage achieved.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
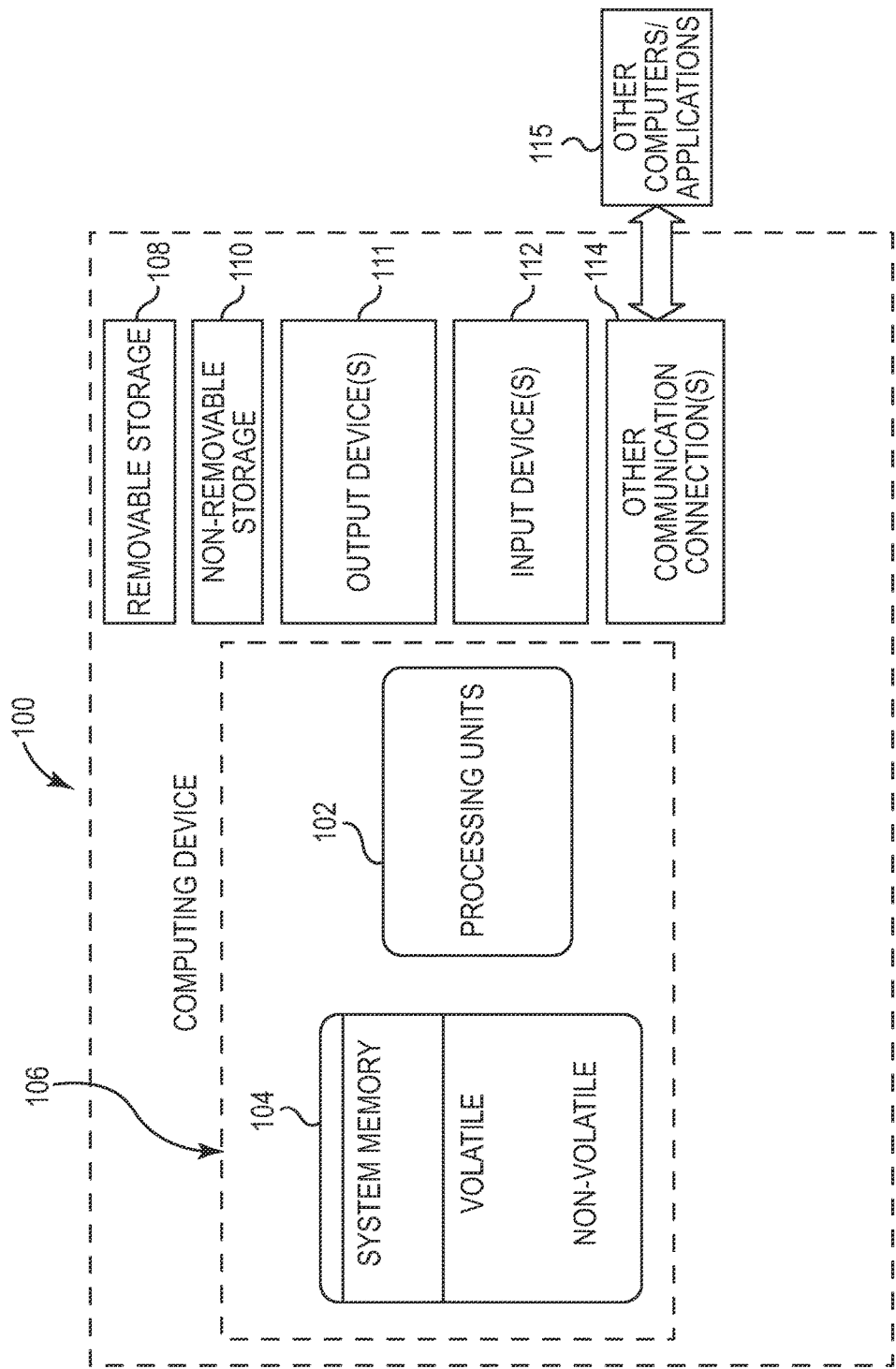
FIG. 1 is a block diagram illustrating an example computing device.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115 such as over a computer network. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment. In addition, the computing device can be configured to run unmanaged code, such as application built in an unmanaged language such as certain forms of Basic, C++, and others.

In general, the memory 104 is organized into three segments for illustration including a code segment, a stack segment, and a heap segment. The code segment is configured to store the compiled code of the computer program, which generally includes user defined function and system function. The stack is a memory segment that stores data for the use with the computer program. The stack stores data allocated for automatic variables within function. Data is stored in the stack with a Last In First Out (LIFO) method. The heap is also a memory segment stores data for use with the computer program, but is used for dynamic memory allocation. Blocks of the memory segment are allocated and freed in an arbitrary order, and the pattern of allocation and size of the blocks are not known until runtime. The stack includes a place for variables that are declared and initialized before runtime are stored whereas the heap includes a place for variables created or initialized at runtime are stored. Data race conditions occur when concurrent threads attempt to access variables in the stack and heap.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a unique thread identifier, and a thread context (or thread state) until the thread is scheduled. A thread context includes the thread's set of machine registers, the kernel stack, a thread environmental block, and a user stack in the in the address space of the process corresponding with the thread. In parallel applications, threads can be concurrently executed on the processor 102.

Figure 2:
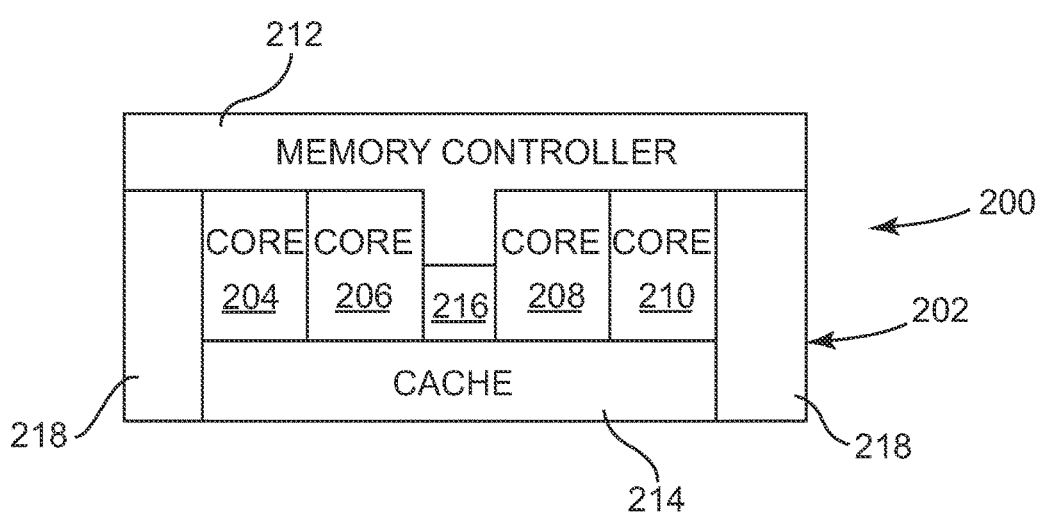
FIG. 2 is a schematic diagram illustrating an example of a multiple core processing system of the computing device of FIG. 1.

FIG. 2 an example multiple core processor 200 that can be implemented in the computing device 100 as processor 102 to concurrently execute threads. This example includes multiple cores implemented on a single die 202. Other examples are contemplated where the processor 102 exists on separate chips or even separate computer system, and the like. The example of FIG. 2 includes four physical processor cores 204, 206, 208, 210, or simply four physical cores, where each of the physical cores is available to process at least one application thread concurrently with at least one other physical core processing another thread. The physical cores 204, 206, 208, 210, are adjacent to a memory controller 212 and a cache 214 on the die 202 as shown. An example of the cache can include a shared level-three cache. In the example die 202, a queue 216 is disposed the die between the memory controller 212 and the cache 214. The illustrated configuration is representative of chip including processors currently available under the designation "Nehalem" available from Intel Corp. of Santa Clara, Calif. The die 202 can include other features 218 or combination of features such as a memory interfaces, miscellaneous input/output blocks, proprietary interconnects, expansion card interfaces, and the like.

In the example, each physical core is capable of efficiently and concurrently executing multiple threads of a concurrent process. Such physical cores are often referred to as "Simultaneous Multi-Threading," or often simply "SMT," cores, and the concurrently executed threads on each physical core share hardware resources included with the single physical core. In the example of the multiple core processing system 200, each physical core is capable of multithreading. Multithreading technology aims to increase core efficiency through thread-level and instruction-level parallelism. Each physical core capable of multithreading, or the like, can present the operating system with as many logical cores as concurrently executing threads. In the example multiple core processing system 200, each physical core 204, 206, 208, 210 is capable of concurrently executing two threads, and thus provides the operating system with eight concurrent logical cores. The computing device 100 can theoretically execute as many concurrent threads as there are logical cores in the device 100. In one example of an operating system, the operating system available under the designation "Windows 7" from Microsoft of Redmond, Wash., supports more than sixty-four logical cores on a single computing device 100.

Dynamic data race detection is a technique used by developers of concurrent applications that detects order-less conflicting accesses to shared-memory location in one execution of the concurrent applications. Dynamic data race detectors are tools or engines designed to run alongside an executing target application to test the target application for concurrent access of multiple threads to a shared variable. Often, dynamic data race detection is performed during beta testing of industrial applications.

Dynamic data race detectors have been traditionally classified as happens-before detectors and lockset-based detectors, and each have advantages and disadvantages over the other. Lockset-based detectors are efficient, but they can report false positives, i.e., falsely report a data race when there is none, while happens-before detectors do not report false positives. Happens-before detectors are more general and can be applied to applications with forms of non-lock-based synchronization, but they are less efficient to implement and are more likely to suffer false negatives, i.e., fail to report a data race when there is one, than lockset-based detectors. Hybrid dynamic race detectors have been designed to combine the advantages of each class of detector while reducing negative effects. While such hybrid data race detectors include improvements in data race detection and runtime overhead, large runtime overheads in data race detectors still remain a concern for researchers.

Generally, at least two primary sources of overhead exist in dynamic data race detectors. First, the detector instruments the memory operations and the synchronization operations executed by the target application. Thus, high performance costs result from the increased number of addition instructions executed at runtime. Second, the detector also maintains metadata for each memory location accessed by the target application for use with the detection algorithms. Maintaining this metadata incurs additional memory cost further increasing overhead. For example, memory consumption in happens-before detection algorithms can use 8n bytes for an array of size n.

Designers of dynamic data race detectors have attempted to reduce runtime overhead by reducing coverage. One technique of dynamic data race detection reduces overhead by sampling and analyzing only selected memory accesses during execution of the target application. Sampling approaches generally have difficulty capturing data race because most memory accesses do not result in data races and a sampling approach attempts to capture the multiple access in order to detect a data race. In order to account for the reduced probability of sampling both accesses of a data race, researchers create new, more complicated detection algorithms. For example, researchers have developed a cold-region hypothesis that data races are likely to occur in infrequently accessed regions of the program. The hypothesis supposes that data races in hot regions of well tested applications either have already been found and fixed or are likely to be benign. The sampling rate of a function in the detection algorithm is determined by how frequently the function is executed, and the more frequently a function is executed the fewer accesses are sampled.

Figure 3:
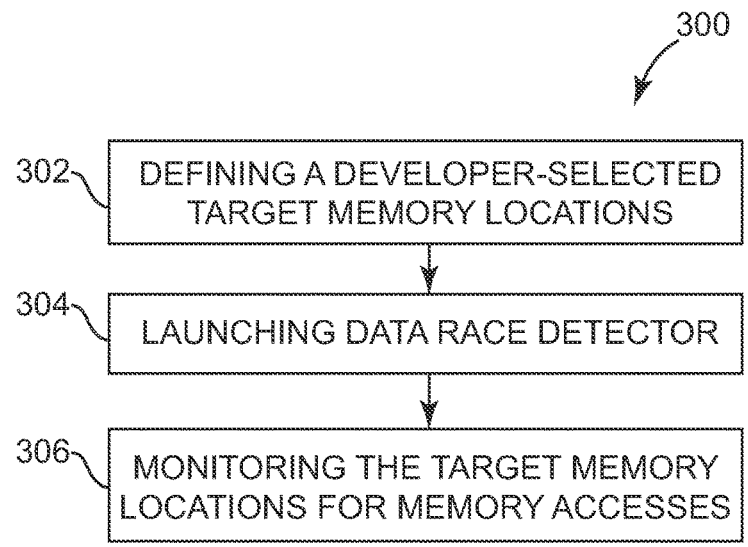
FIG. 3 is a block diagram illustrating an example method of dynamically detecting data races occurring in a multithreaded application executed on the system of FIG. 2.

FIG. 3 illustrates an example method 300 of a data scoped dynamic data race detection technique of the present disclosure that can test for data races on a defined subset of shared memory locations. The method includes defining developer-selected target memory locations at 302, launching the data race detector at 304 in one example of the method 300, and monitoring memory accesses of an application within the target memory locations for data races at 306. Rather than sampling accesses for all locations in memory, the method 300 monitors just the memory accesses of the application in a defined location. The method can be repeated with a wider defined set of target memory locations or on another set of defined target memory locations until the developer is satisfied with the amount of data race bug coverage achieved.

The method 300 of data race detection includes several advantages over sampling based data race detection, and three advantages are listed here. First, method 300 gives programmers more control to focus on specific memory locations of interest, whereas the sampling based detection has limited interaction with programmers. Second, method 300 can provide complete coverage on "suspicious" memory regions based on programmers' knowledge or estimates, whereas the sampling based detection has partial coverage on all code regions, which may ignore some data races correspondingly. Third, method 300 allows programmers to expand the coverage incrementally, while the sampling based detection is inclined to duplicate the same coverage at different runs.

Method 300 can be implemented as a tool to be run on the computing device 100. In one example, the tool is a software program or part of a software package. The software program can be included in a computer readable storage medium storing computer executable instructions for controlling a computing device, such as computing device 100, to perform the method 300. In one example, the tool can be a part of an integrated development environment, or IDE. The IDE can include a code editor, a compiler, build tools, a debugger and other tools for developing and testing an application. An example of an IDE is available under the trade designation "Visual Studio" from Microsoft. The software program can also be a separate product that can be used with one or more IDE packages or as a stand-alone product.

Figure 4:
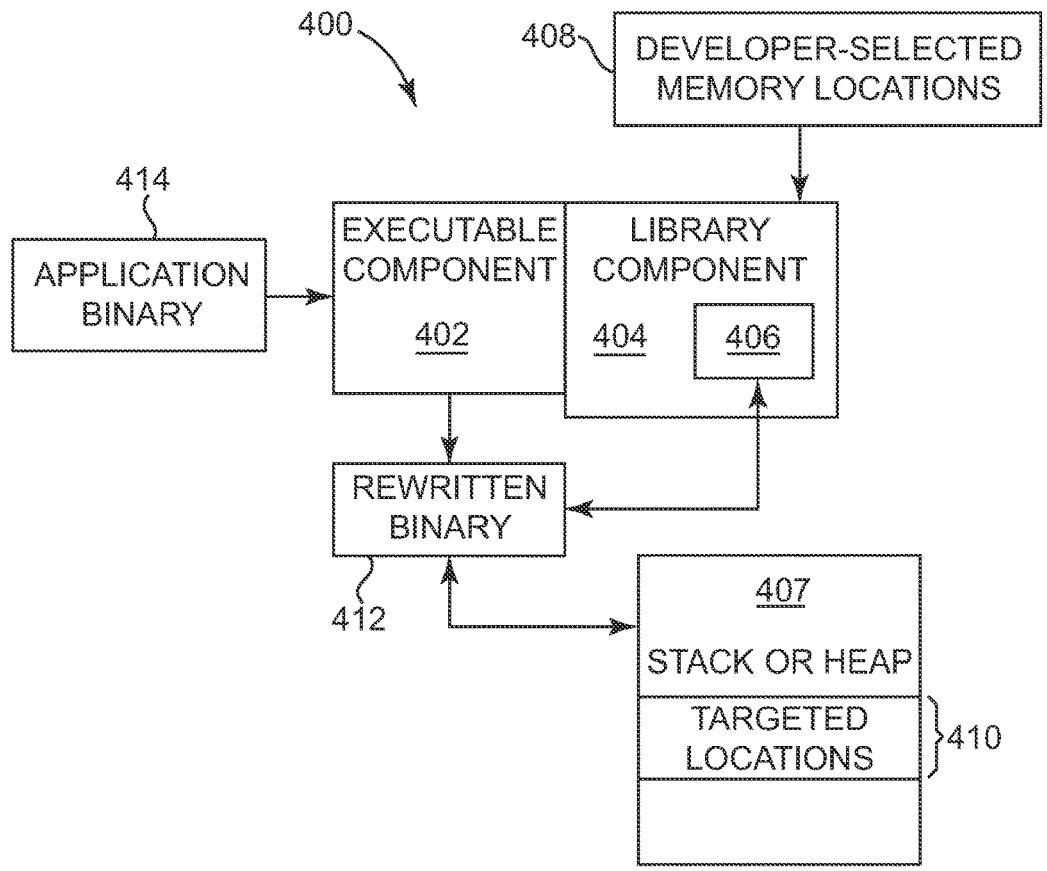
FIG. 4 is a block diagram illustrating an example data race detector suitable for implementing the method of FIG. 3.

FIG. 4 illustrates an example data race detector 400 that can be used to implement method 300. In one example, the data race detector 400 includes an execution component 402 and a library component 404. The execution component 402, which can be abbreviated as DataRaceDetector.exe, launches the data race detector 400. The library component 404, which can be abbreviated as DataRaceDetector.dll, implements a data race detection engine 406 and provides application program interfaces (APIs) for defining target memory locations and other functions.

The library component 404 provides an API that allows developers to provide an input 408 to define target memory locations 410 as a subset of locations within the heap or stack 407 of the memory 104 and can implement 302 of method 300. The target memory locations 410 can be redefined with another received input 408 to add or remove of target memory locations or to change to define a new group target memory locations.

If the target memory locations 410 are on the heap, library functions (or a special library for instrumenting selected functions) are called with the library component 404. For example, a C language library function such as malloc, or related functions calloc, or realloc can be used to define targeted memory locations 410. The malloc function in a C language can be used to allocate a fixed size of memory, the calloc function allocates and initializes the memory, and the realloc function allows resizing the allocated memory.

In a particular example of where the detector 400 allocates the target memory locations on the heap, explicit function calls to allocation functions in a data race detection library stored in memory. The functions calls _DRD_malloc( ), _DRD_calloc( ), and _DRD_realloc( ) are called instead of C library functions malloc( ), calloc( ), or realloc( ), respectively, to specify the allocated target memory locations 410 that will be monitored by the detector 400 at runtime. The functions in the data race detection library have the same or generally similar type signatures as their corresponding C library functions. Additionally, the allocated target memory locations 410 can be freed by _DRD_free( ), which also includes the same or similar type signatures as the C library function of free( ). In one example, heap allocations are intercepted and directed to the data race detection library for its corresponding function. The data race detection library always checks for errors in memory locations allocated from its heap. This also allows for an efficient lookup of whether a memory location should be traces for data races or not.

If the target is a local variable allocated on the stack, then a function _DRD_target(<variable's address>, <variable's size>) is explicitly inserted after the variable declaration to specify that variable with the given address is the target. The target on the stack can be removed from the race detection list by calling _DRD_cleanTarget(<variable's address>, <variable's size>) upon exiting a function call. The target location is recorded into an address lookup table created in memory, and the local variable is allocated on the stack by a runtime system.

For illustration, the following example defines a head node of a linked list and the length of the length list as the target:

```
#include "DRD.h" //header file of DataRaceDetector.dll
struct Node
{
  int value;
  struct Node * next;
};
void foo( )
{
  int length = 0;
  struct Node * head;
  head = (struct Node *)_DRD_malloc(sizeof(struct Node));
  _DRD_target(&length, sizeof(length));
  ...
  _DRD_free(head);
  _DRD_cleanTarget(&length, sizeof(length));
}
```

In this example, the detection of the local variable is not started until after the calling of _DRD_target( ) is reached.

The data detector 400 can be launched with the execution of a modified or rewritten application binary 412 based on an original binary of the target application 414 and can be used to implement 304 of method 300. The execution component 402 modifies the original binary 414 by inserting a probe function at memory access operations and by detouring synchronization operations into the executable rewritten application binary 412. In one example, a probe function is inserted at each memory access operation and each synchronization operation is detoured. The execution component 402 then launches the rewritten application binary 412. Table 1 shows examples of how the original application binary is rewritten.

TABLE 1

| Original Binary | Rewritten Binary |
| --- | --- |
| Ld [rs], rt (load value from the address stored in register rs into register rt) | Ld [rs], rt _DRD_memoryLoad (address in rs, size of the value, current thread id) |

TABLE 1-continued

| Original Binary | Rewritten Binary |
| --- | --- |
| St rs, [rt] (store the value in register rs to the address stored in rt) | St rs, [rt] _DRD_memoryStore (address in rt, size of the value, current thread id) |
| Lock (lockvar) | _DRD_lock(lockvar, current thread id) |
| Unlock (lockvar) | _DRD_unlock(lockvar, current thread id) |

As the rewritten application binary is running, the data race detection engine 406 monitors each target location 410 of the memory 104 and reports potential data races as an example implementation of 306 of method 300. The detection engine consists of a pre-allocated "special" heap, which is consumed by _DRD_malloc( ), _DRD_calloc( ), and _DRD_realloc( ), a memory address lookup table, which records all target memory locations at stack, a shadow heap, which keeps the sharing state of each target location, a set of API functions, which operates on the address lookup table, and a set of probe functions and detour functions, which operates on the shadow heap and accomplishes the core race detection algorithm. Pseudo code for typical API functions, probe functions and detour functions is listed as below. Pseudo code for the rest of API functions, probe functions and detour functions is similar.

```
_DRD_malloc(int size)
{
  void * ptr = allocate a piece of memory of size "size" from the special heap
}
_DRD_free(void *prt)
{
  Nothing is done here. The special heap is freed at the exit of the application.
}
_DRD_target(void * addr, int size)
{
  addressTable.Add(addr, size);
}
_DRD_cleanTarget(void* addr, int size)
{
  addressTable.Delete(addr, size);
}
_DRD_memoryLoad(int address, int size, int threadID)
{
  if (address is within the special heap ||
    addressTable.Contains((void *)address, size))
    {
      LookupShadowHeap((void *)address, size);
      UpdateSharingState and detect races
    }
}
_DRD_lock(int lockaddress, int threadID)
{
  if (lock(lockaddress) is successful)
  {
    update concurrent set of each thread
  }
}
_DRD_unlock(int lockaddress, int threadID)
{
  update concurrent set of each thread
  unlock(lockaddress)
}
```

The data race detection engine 406 monitors each target location 410 of the memory 104 based on applying a suitable data race detection algorithm. The example data race detector 400 can include a happens-before, lockset-based, hybrid, or other suitable data race detection algorithm either know or yet to be discovered. In one example, the data race detector 400 includes a hybrid detection algorithm with an adaptive approach that automatically directs more effort to more suspicious regions and can be implemented inside a virtual machine such as one designated as Common Language Runtime available from Microsoft.

In a simplified description, the hybrid detection algorithm tracks a lockset for each monitored variable within the defined data scope and a set of concurrent access called a threadset with a vector clock technique, now known in the art, to determine which sections are known be ordered before other actions. When a thread performs a memory access on a monitored variable, a label is formed including a thread identifier and a private clock value, and the label is added to the threadset for the variable. A vector clock removes labels for any memory accesses that are ordered prior to the current access. In general, when a threadset includes more than one label, the algorithm estimates that the variable is being concurrently accessed. The detector issues a race condition warning if a common lock or synchronization is not protecting the concurrent access within the target memory locations.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of detecting data races in an application, the method comprising:
defining, with at least one processor, user-selected target memory locations as a subset of target addresses that is less than all addresses in a shared-access memory based on an input received into a memory with a library function selected from a data race detection library component;
automatically modifying an application binary of the application with a data race detection execution component to include a probe associated with the user-selected target memory locations;
monitoring the modified application binary during runtime, with the at least one processor, memory accesses within the selected target memory locations for data races including inserting a first function to monitor memory locations on a heap for data races and a second function to monitor memory locations on a stack for data races;
the first function including calling the library function to define and initialize memory to continuously monitor target memory locations on the heap;
the second function including allocating a local variable by address and size at runtime to monitor target memory location on the stack and the detection of the local variable after the second function is reached; and
tracking a sharing state of the target memory location on the heap in a shadow heap and recording the target memory location on the stack into an address lookup table.

2. The method of claim 1 wherein the selected target memory locations are included on just the heap and the stack in the memory.

3. The method of claim 1 wherein defining selected target memory locations include intercepting heap allocations and directing intercepted heap allocations to a memory selection mechanism in the memory.

4. The method of claim 1 wherein selected target memory locations on a heap are allocated with a data race detection library function corresponding to standard heap allocation routines including malloc, calloc, and realloc.

5. The method of claim 1 wherein selected target memory locations on a stack are allocated with a data race detection library function having target location as variables.

6. The method of claim 5 wherein addresses of selected target memory locations on a stack are recorded in a table stored in the memory.

7. The method of claim 1 and further including executing an application binary of the application with the processor.

8. The method of claim 1 wherein the method is repeated with a wider defined set of target memory locations.

9. The method of claim 1 wherein monitoring memory accesses includes issuing a warning if a common lock or synchronization is not protecting a concurrent access within the selected target memory locations.

10. The method of claim 7 wherein monitoring memory accesses includes applying a data race detection algorithm to the application binary with the at least one processor.

11. A computer readable storage device storing computer executable instructions for controlling a computing device to perform a method with a target application, the method comprising:
defining user-selected target memory locations as a subset of target addresses that is less than all addresses in a shared-access memory based on a received input from a library function selected from a data race detection library component;
automatically modifying an application binary of the application with a data race detection execution component to include a probe associated with the user-selected target memory locations;
launching the modified application binary of the target application with the data race execution component; and
monitoring memory accesses of the modified application binary of the target application within the selected target memory locations for data races during runtime of the modified application binary including inserting a first function to monitor target memory locations on a heap for data races and tracking a sharing state of the target memory location on the heap in a shadow heap, and a second function to monitor target memory locations on a stack for data races and recording the target memory location on the stack into an address lookup table;
the first function calling the library function to define and initialize memory to continuously monitor target memory locations on the heap; and
the second function allocating a local variable by address and size at runtime to monitor target memory location on the stack and the detection of the local variable after the second function is reached.

12. The computer readable storage device of claim 11 including an application program interface for receiving the input used to define the selected target memory locations.

13. The computer readable storage device of claim 12 wherein the application program interfaces are included in a library component of the computer executable instructions.

14. The computer readable storage device of claim 11 wherein the selected target memory locations include a subset of the memory locations of the stack or the heap accessible with the target application.

15. The computer readable storage device of claim 11 wherein defining the selected target memory locations includes accessing data race detection library functions based on whether the target memory locations are allocated on the heap or the stack.

16. The computer readable storage device of claim 15 wherein the data race detection library includes at least one library function corresponding to standard heap allocation routines including malloc, calloc, and realloc and wherein selected target memory locations on a stack are allocated with a data race detection library function having target location as variables.

17. The computer readable storage device of claim 16 wherein the launching of the target application is performed with a data race detector included in an execution component of the computer executable instructions.

18. The computer readable storage device of claim 11 wherein monitoring memory access includes issuing a warning if a common lock or synchronization is not protecting a concurrent access within the selected target memory locations.

19. A computer readable storage device storing a development tool including computer executable instructions for controlling a computing device having a plurality of logical cores configured to execute a selected target application with concurrent threads, the development tool configured to perform a method comprising:

defining user-selected target memory locations as a subset of target addresses that is less than all addresses in a shared-access memory based on a received input using data race detection library functions;

automatically modifying an application binary of the application with a data race detection execution component to include a probe associated with the user-selected target memory locations;

launching the modified binary application based on a binary application of a target application with an execution component; and monitoring memory accesses of the modified binary application within the selected target memory locations for data races and issuing warnings for each concurrent memory access not protected with synchronization including inserting a first function to monitor memory locations on a heap for data races and tracking a sharing state of the target memory location on the heap in a shadow heap and a second function to monitor memory locations on a stack for data races and recording the target memory location on the stack into an address lookup table; and the first function including calling the library function to allocate memory to continuously monitor target memory locations on the heap, user-selected target memory locations on the heap are defined and initialized with a data race detection library function corresponding to standard heap allocation routines including malloc, calloc, and realloc; and the second function including allocating a local variable by address and size at runtime to monitor target memory location on the stack, selected target memory locations on the stack are allocated with a data race detection library function having target location as variables in which the local variables are detected after the second function is reached.

20. The computer readable storage device of claim 19 and further comprising redefining the selected target memory locations and repeating the monitoring memory accesses of the binary application.

* * * * *